Patented Mar. 11, 1924.

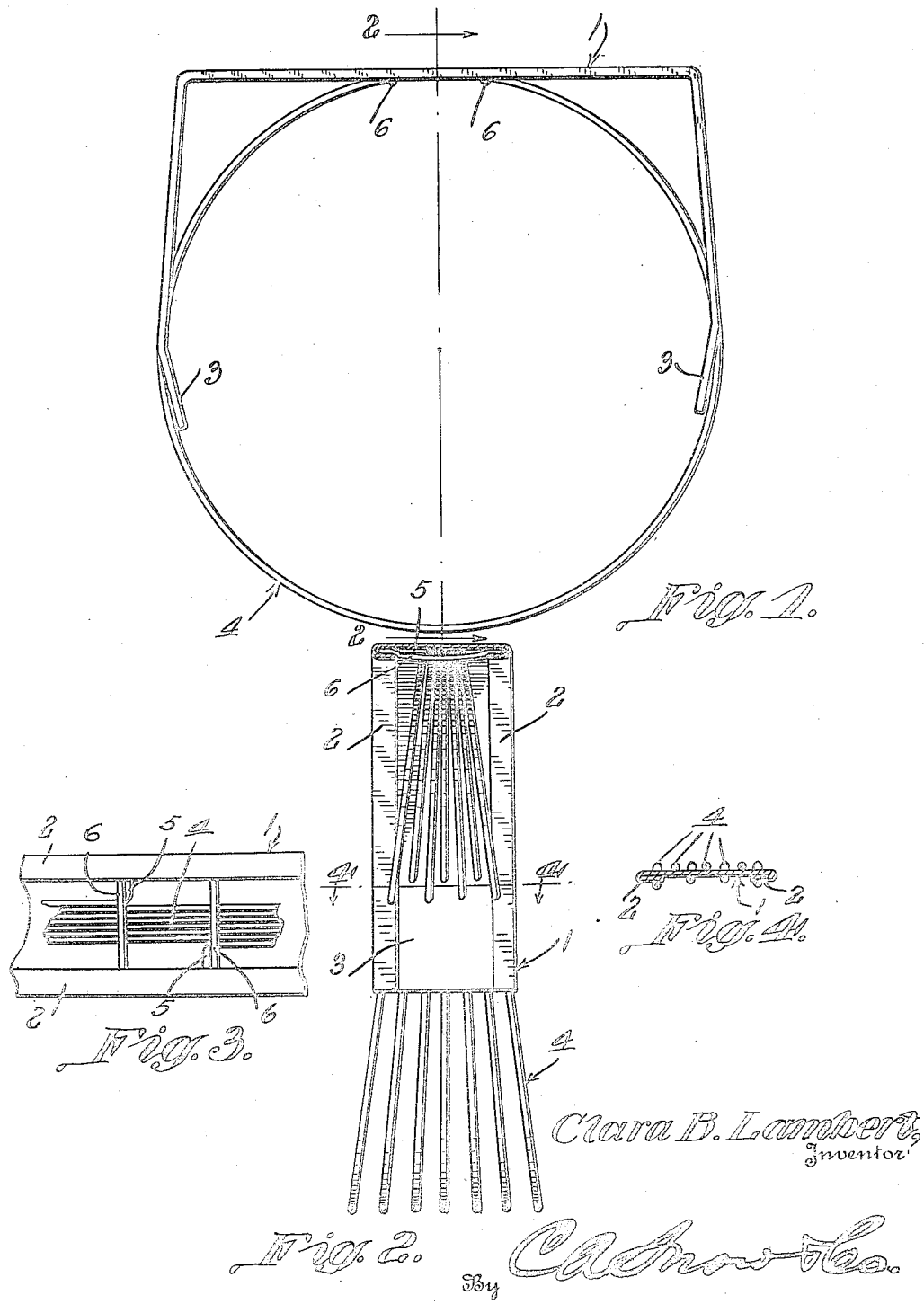

1,486,255

UNITED STATES PATENT OFFICE.

CLARA BIRCHARD LAMBERT, OF PASADENA, CALIFORNIA.

WIRE CHOPPER, PIE-CRUST MIXER AND FLAKER.

Application filed June 21, 1923. Serial No. 646,932.

*To all whom it may concern:*

Be it known that I, CLARA B. LAMBERT, a citizen of the United States, residing at Pasadena, in the county of Los Angeles and State of California, have invented a new and useful Wire Chopper, Pie-Crust Mixer and Flaker, of which the following is a specification.

This invention relates to kitchen utensils and more particularly to choppers, mixers or cutters for flaking or making pie crust and the like.

The object of the invention is to provide a simple and efficient device of this character by the use of which pie crust or other pastry may be quickly mixed and flaked or other food stuffs chopped without touching it with the hands.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:

Figure 1 represents a side elevation of the device constituting this invention.

Fig. 2 is a vertical section thereof.

Fig. 3 is a detail plan view taken inside the handle; and

Fig. 4 is a section taken on the line 4—4 of Fig. 2.

In the embodiment illustrated a handle 1 is shown which may be of any desired configuration being here shown substantially inverted U-shaped and constructed of a strip of heavy sheet metal with the edges thereof folded inward flat against its inner face to form reinforcing beads 2. The ends of this member 1 are deflected or bent slightly inward as shown at 3 and are apertured for the passage therethrough of the cutters or mixers 4, any desired number of which may be employed, seven being here shown. These cutters may be of any suitable or desired construction and are here shown formed of a single wire coiled to form the cutters, the ends 5 of said wire being extended in opposite directions and secured under the folded flanges or beads 2 as is shown clearly in Fig. 3. The respective coils of this wire are threaded through the deflected ends 3 of the handle as shown clearly in Figs. 2 and 4, the alternate wires passing through the handle in different planes as is shown clearly in Fig. 2. The coils constituting the cutters 4 are brought together in close contact on the inner face of the cross bar of the handle 1 as is shown clearly in Fig. 3 and are held in this position by cross rods or wires 6, two of which are here shown. From this point of connection the coils diverge to form the spaced cutters or mixers 4 which are located between the ends 3 of the handle and are here shown substantially semi-circular in form although obviously they may be of any desired form or configuration.

In the use of this device the handle 1 is grasped and the cutters 4 forced into cutting engagement with the material to be mixed, the device being operated in a pounding manner and also it may be used to beat up or whip the mixture.

Various changes in the form, shape, proportion, material and other minor details of construction may be made without departing from the principle or sacrificing any of the advantages of the claimed invention.

I claim:—

1. A pie crust mixer and flaker comprising a handle having a plurality of transversely alined laterally spaced mixers carried thereby, said mixers being bowed outwardly longitudinally and secured at their ends to said handle.

2. A pie crust mixer and flaker comprising a substantially inverted U-shaped handle having mixers formed of wire coils secured at their ends to the ends of the handle.

3. A device of the class described comprising a substantially inverted U-shaped handle composed of a strip of sheet metal having the side edge thereof folded inwardly to form reinforcing beads, a wire coiled to form a plurality of laterally spaced blade-like elements, the members of the coil being threaded through the ends of the handle and the terminals thereof extending under and secured by said beads.

4. A device of the class described comprising a substantially inverted U-shaped handle composed of a strip of sheet metal having the side edges thereof folded inwardly to form reinforcing beads, a wire coiled to form a plurality of laterally spaced blade-like elements, the member of the coil being threaded through the ends of the handle and the terminals thereof extending under and secured by the beads, and spaced transversely extending keepers arranged over the members of the coil and having their ends extending under the bead at opposite edges of the handle.

In testimony that I claim the foregoing as my own, I have hereto affixed my signature in the presence of two witnesses.

CLARA BIRCHARD LAMBERT.

Witnesses:
FLORENCE WIGHTMAN,
JOHN W. EBERLE.